INVENTORS
Walter P. Kistler
Vernon H. Siegel

INVENTORS
Walter P. Kistler
Vernon H. Siegel

INVENTORS
Walter P. Kistler
Vernon H. Siegel

United States Patent Office 3,444,743
Patented May 20, 1969

3,444,743
LINEAR SERVO ACCELEROMETER HAVING A POST SUSPENSION SYSTEM
Walter P. Kistler and Vernon H. Siegel, Clarence, N.Y., assignors, by mesne assignments, to Kistler Instrument Corporation, a corporation of Delaware
Continuation-in-part of application Ser. No. 497,377, Oct. 18, 1965. This application Feb. 15, 1966, Ser. No. 527,560
Int. Cl. G01p 15/08
U.S. Cl. 73—517      22 Claims

ABSTRACT OF THE DISCLOSURE

Disclosed is a linear response force balance or servo-type accelerometer in which the force of acceleration applied to a seismic mass or inertial element is counterbalanced by an electromagnetic force acting on the seismic mass. The seismic mass includes a forcer coil located in the field of a permanent magnet through which a current is passed to generate a counterbalancing force. A capacitive pickoff senses coil movement. The coil is impregnated with resin and supported by tangential wires. Movable and stationary rigid posts form, with the wires, three parallelograms to provide more nearly true rotational and translational movement of the seismic mass along the sensitive axis of the accelerometer.

---

This application is a continuation-in-part of copending application Ser. No. 497,377, filed Oct. 18, 1965, now Patent No. 3,323,372, which is in turn a continuation of application Ser. No. 139,666 filed Sept. 21, 1961, now abandoned, for "Linear Servo Accelerometer."

The present invention relates to a new improved linear response force balance or servo type accelerometer in which the force from an acceleration, applied to a seismic or inertia element, is counterbalanced by an electromagnetic force generated by a current flowing in a servo loop and energizing a movable coil in a magnetic field, with an improved capacitance pickoff arrangement of great sensitivity and increased range. This invention is also concerned with an improved miniaturized accelerometer of the type described in which all associated electronic circuitry utilized to operate the servo loop is located in the same casing with the mechanical parts of the accelerometer, thus providing a complete instrument in a single housing, which instrument is of smaller size, greater ruggedness, and higher accuracy than has been possible heretofore in instruments of comparable relatively moderate cost by reason of various mechanical and electrical features to be described.

Various accelerometers have been suggested heretofore and in general such accelerometers include a test or inertial mass, or seismic element, arranged to respond to the resultant of acceleration and the gravitational forces acting thereon and to be moved by such resultant forces in a particular direction. One general type of accelerometer operating in this manner, with which the present invention is primarily concerned, is a so-called servo accelerometer in which the inertial mass includes an electrical coil disposed in a magnetic field and arranged to move relative to such magnetic field. Movement of the mass upon the imposition of resultant forces in the direction of permissible movement (along the sensitive axis of the accelerometer) is utilized to produce a control signal which acts as an output signal from the system indicating the amount of movement and accordingly the resulting force thus imposed on the mass. The signal thus produced is further utilized to generate a current which is in turn fed back to the electrical coil comprising a portion of the inertial mass (normally termed the "forcer" coil) thereby effecting a restoring force for returning said inertial mass to a predetermined zero position relative to its associated magnetic field.

Prior self-contained instruments have lacked the features of compactness and ruggedness which are highly desirable in many accelerometer applications. In particular, such prior self-contained accelerometers have generally employed an unbalanced meter movement suspended in jewel pivots as the seismic element, and the system has accordingly been extremely delicate and very sensitive to vibration. Furthermore, by reason of the arrangement thus employed these prior systems have exhibited hysteresis caused by friction in the pivots and this has inherently limited the resolution and accuracy of the accelerometer. Such disadvantages have been further complicated by so-called cross coupling effects arising from the form of suspension normally employed resulting in the fact that the seismic element of the accelerometer tends to rotate at least partially about a shaft or axis of rotation instead of moving along a straight line. Other high precision accelerometers have generally been quite large and very expensive instruments, have required elaborate electronic circuitry needed to operate the servo loop and in some cases have employed fluid flotation or air bearings in order to be free of hysteresis and to guide the seismic element along a well defined straight axis. These systems of course necessarily involve large and expensive arrangements including the provision of auxiliary supplies of a compressed air, accurate temperature control equipment, etc., all of which severely limit the uses to which the resultant instrument may be put.

In order to simplify servo accelerometers and to decrease the cost thereof still other devices have been proposed, as for example mounting of the seismic element by suspending its opposed ends respectively by a plurality of radially strung wires, e.g., three such radial wires at each end of the seismic element. Such a suspension gives relatively good radial constrainment but allows insufficient axial freedom of movement and as a result such systems exhibit poor null stability as well as temperature drift. Furthermore, such arrangements have employed an elongated central shaft as the seismic element whereby it is relatively heavy, thus causing the overall instrument to have low natural frequency and to exhibit poor behavior under vibrations. Hence, this prior type accelerometer has not been completely successful.

At least some of these and other problems are avoided by the linear accelerometer and suspension system disclosed in assignee's U.S. Patent 3,020,767, issued Feb. 13, 1962. In that patent the seismic mass is supported by a plurality of tangentially extending rigid arms of channel form in cross section which arms are cut away or notched at each end to permit flexure of the arms in a direction generally parallel to the sensitive axis of the accelerometer. However, it has been found that the accelerometer of Patent 3,020,767 suffers from certain disadvantages including the fact that the rigid arms or channel elements of Patent 3,020,767 are subject to breakage when subjected to substantial transverse forces, as under a high G load.

A much more satisfactory linear accelerometer which has proved highly successful is disclosed in copending application Ser. No. 497,377, filed Oct. 18, 1965, now U.S. Patent No. 3,323,372, issued June 6, 1967, which accelerometer includes novel electrical circuitry in combination with a novel and improved suspension system. In the device of the aforesaid copending application the seismic element is supported by a plurality of flexible tangential wires which are all connected to the inertial element at substantially the same radial distance from the axis of movement of the inertial element. However, it has been found that while significantly improving over prior constructions and completely satisfactory in most applications, the tangential wire suspension system of that application results in movement of the inertial mass which is not in all cases completely linear, especially when the accelerometer is subjected to varying environmental conditions, particularly widely varying temperatures. One of the chief factors contributing to this lack of linearity as a function of temperature has been found to be attributable to the metallic spool upon which the forcer coil is wound, which spool forms a part of the inertial mass in the aforesaid construction and tends to expand and contract with temperature. In addition it has been found that due to temperature variations and other causes the related pairs of suspension wires and associated structure do not always form a true parallelogram so as to insure complete linearity of movement of the seismic mass under the influence of applied forces.

The device of the present invention constitutes an improvement over the accelerometer structure of copending application Ser. No. 497,377, filed Oct. 18, 1965, and particularly over the suspension system disclosed in that application. In the present invention, through the elimination of the metallic spool and the provision of a novel support assembly including a plurality of rigid posts extending generally parallel to the sensitive axis of the accelerometer, it has been possible to construct an improved device having significantly increased linearity and one which is surprisingly insensitive to temperature variations.

In the present invention, the seismic mass is again supported by a plurality of tangentially extending flexible wires which permit the seismic mass to undergo pure rotational and translational movement much in the manner of an advancing screw. However, in the present invention the metallic spool upon which the coil was wound in the prior construction is eliminated and attachment is made directly to the coil, the latter being impregnated with a suitable resin so as to form a unitary rigid structure to which the support wires may be connected. An additional important feature of the present invention resides in the provision of a plurality of rigid posts extending generally parallel to the sensitive axis of the accelerometer and to which posts are attached the ends of the flexible and tangentially extending wires. The wires and posts are arranged to cooperate in pairs along the length of the sensitive axis such that the support structure forms a plurality of true parallelograms, the opposite sides of which are formed by a pair of elongated rigid posts.

It is therefore one object of the present invention to provide an improved linear servo accelerometer.

Another object of the present invention is to provide an improved suspension system for the movable seismic mass of an accelerometer.

Another object of the present invention is to provide a linear servo accelerometer wherein the seismic mass in the form of a magnetic coil is directly suspended by a plurality of tangentially extending flexible wires.

Another object of the present invention is to provide a suspension system for a linear servo accelerometer having increased linearity and which accelerometer is substantially insensitive to extreme temperature variations.

Another object of the present invention is to provide an improved linear accelerometer incorporating a light weight seismic mass and improved capacitive pickoff in conjunction with a servo electronics package exhibiting increased sensitivity, reliability and resistance to changes in output with varying environmental conditions. In the present invention, the forcer coil (preferably also test coil) is impregnated so as to form a unitary rigid structure. Suitably attached at spaced angular intervals around the periphery of the coil are a plurality of (preferably three) elongated rigid posts, which posts extend in a direction substantially parallel to the sensitive axis of the accelerometer. A similar set of posts are rigidly secured to a surrounding stationary portion of the accelerometer and a plurality of elongated flexible wires (preferably six in number) have their ends secured to respective movable and stationary posts. That is, a wire is preferably attached to each end of one of the movable posts and the opposite ends of these two wires are then attached to the opposite ends of a corresponding stationary post. The two posts in cooperation with the two wires to which they are attached form a parallelogram lying in a plane parallel to the sensitive axis of the accelerometer which parallelogram has two rigid sides formed by the two rigid posts rendering the suspension system much more accurate and insensitive to temperature variations. Preferably three such parallelogram systems suspend the seismic mass (i.e., impregnated coil and movable capacitor plate) at equally spaced positions about the periphery of the coil.

These and further objects and advantages of the invention will be more apparent upon reference to the following specification, claims and appended drawings wherein:

Figure 1:
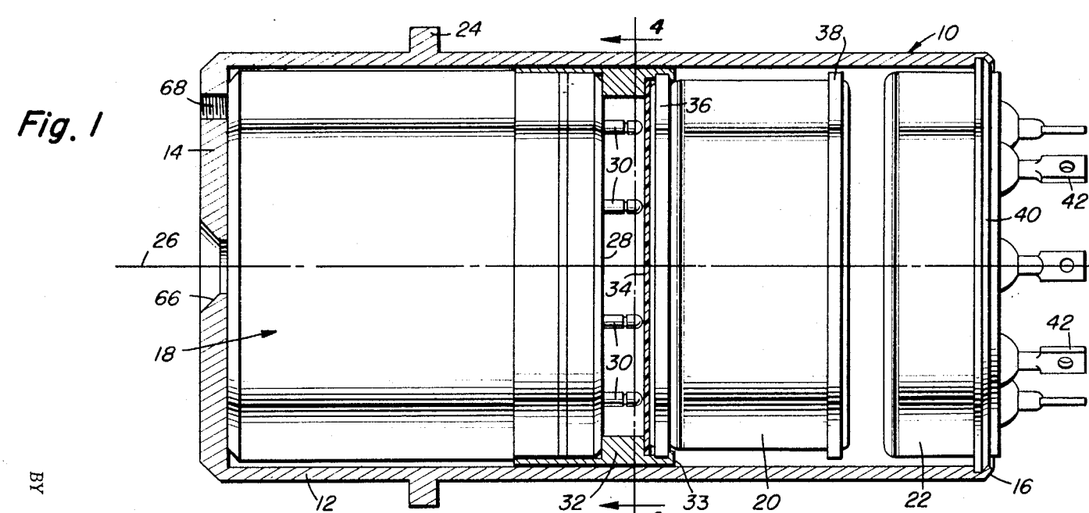
FIGURE 1 is a longitudinal section through the accelerometer housing showing the miniaturized accelerometer package of the present invention.

Referring to the drawings, the novel self-contained accelerometer of the present invention is generally indicated at 10 in FIGURE 1 and is shown to a scale approximately four times its actual size. The accelerometer comprises an elongated tubular housing 12 of suitable material such as stainless steel closed at one end by an integral end plate 14 but having an opening at its other end 16 for the reception of a mechanical assembly generally indicated at 18, an electronic package 20, and a filter package 22. The accelerometer housing is provided with an integral rectangular flange 24 by which the accelerometer may be suitably mounted to a base structure subject to acceleration forces parallel to its sensitive axis 26. The mechanical portion of the assembly or mechanical package 18 terminates in a top cap 28, shown to an enlarged scale in FIGURE 3, which top cap mounts a plurality of electrical connector pins 30. These pins are provided to establish electrical connection between remaining portions of the accelerometer 10 and both the forcer and test coils incorporated in the mechanical package 18 as well as the capacitive pickoff plates also forming a portion of that package.

The mechanical package 18 is spaced from the electronic package 20 by a spacer ring 32 which carries a plastic dust cover or disk 34. Electronic package 20 is mounted on a pair of spaced insulating circuit boards 36 and 38 to which is applied appropriate printed circuitry, the circuit board 36 being retained by the turned over end 33 of spacer ring 32. The other circuit board 38 is appropriately supported in housing 12 by suitable means (not shown) and spaced from the electronic filter package 22. This latter is similarly mounted on a terminal header 40 retained by the turned over end 16 of the housing. Connection to the accelerometer 10 is by way of electrical connectors 42 projecting outwardly from the sealed end of the accelerometer. The various electrical connections between the filter package 22, electronic package 20 and connector pins 30 as well as cooperating structure is not illustrated, it being understood that these components may be electrically connected together in any suitable fashion forming no part of this invention. The dust cover 34 may be provided with suitable apertures for this purpose or may simply be pierced prior to making the connection to pins 30.

Figure 3:
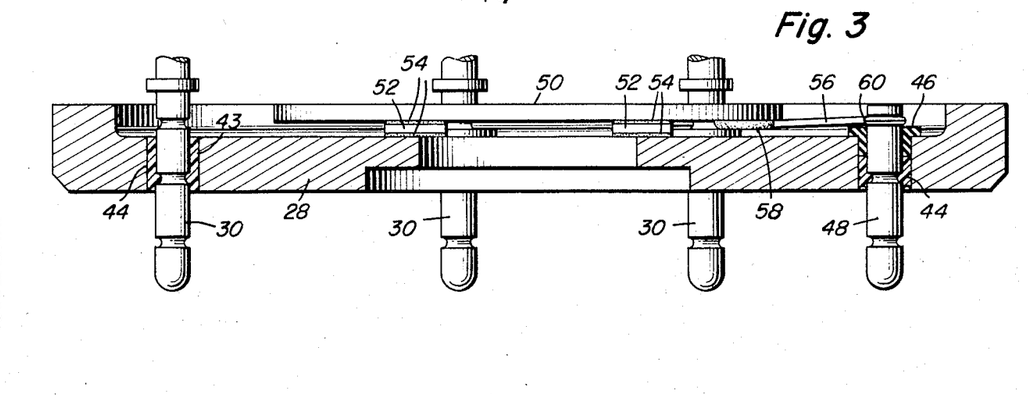
FIGURE 3 is an enlarged cross section through the top cap for the mechanical portion of the assembly of FIGURES 1 and 2.

Referring to FIGURE 3, the pins 30 are secured within apertures 43 in top cap 28 by insulating adhesive such as epoxy as illustrated at 44. There are preferably seven connector pins, six of elongated construction extending inwardly of the mechanical assembly 18 for a purpose more fully described below and one short pin 48 for establishing electrical connection to a stationary capacitor plate 50 forming a portion of a capacitive pickoff as more fully described below. This latter pin is accurately positioned in the top cap by a nylon bushing 46 as well as epoxy 44. Capacitor plate 50 is preferably secured to top cap 28 by a plurality of insulating blocks 52 soldered as at 54 both to the capacitor plate 50 and to the top cap 28. Capacitor plate 50 is preferably secured to the top cap by three such blocks equally spaced about the sensitive axis of the accelerometer adjacent the periphery of the capacitor plate. A conductive metallic lead 56 is soldered at one end as at 58 to the capacitor plate while its other end is wrapped around and received in a groove in pin 48 (and preferably soldered thereto), as illustrated at 60 in FIGURE 3 to establish electrical connection between pin 48 and capacitor plate 50.

Figure 2:
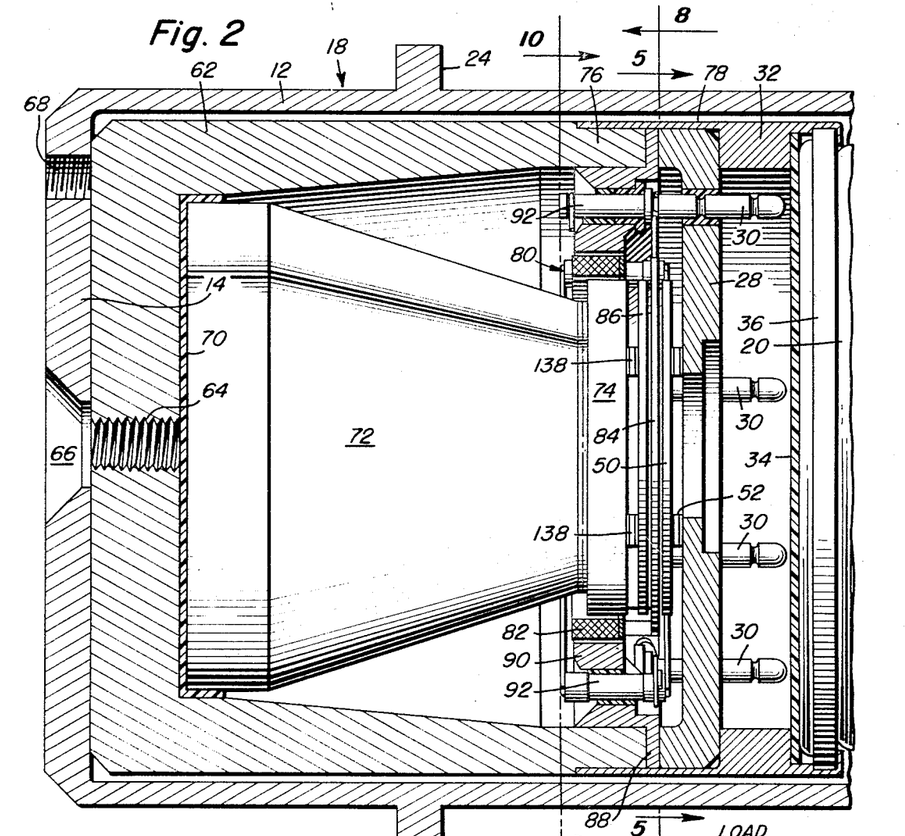
FIGURE 2 is a horizontal section through the mechanical portion of the accelerometer of FIGURE 1 illustrating the seismic mass suspension system and capacitive pickoff of this invention.

FIGURE 2 is a longitudinal view through the mechanical assembly or mechanical package 18 of FIGURE 1 showing the relationship between the various parts of this assembly. Mounted in the housing 12 is a hollow circular cup 62 of magnetic material such as soft iron. This cup is centrally threaded as at 64 to receive a screw for securing the cup to the end 14 of the housing. The housing is provided with a countersunk aperture 66 for receiving the screw. The housing end may also be provided with a plurality of threaded apertures 68 adapted to receive mounting screws for mounting the accelerometer by its end 14 rather than by flange 24. Secured to the soft iron cup 62 by soldering or other means illustrated at 70 is a generally conical, truncated, permanent magnet 72. Attached to the smaller diameter end of the magnet is an enlarged circular disk 74 forming a magnetic pole piece such that the permanent magnet establishes a radical magnetic field between the pole piece 74 and the annular reduced end 76 of iron cup 62. The spacer ring 32 includes an annular projection 78 friction fit over the reduced end portion 76 of the cup.

Positioned in the radical magnetic field previously described is a seismic assembly or movable mass generally indicated at 80 which mass includes a double coil 82 impregnated with a suitable resin such as epoxy so as to render the annular coil 82 a rigid and unitary structure. The coil is made up of a plurality of windings and while shown as a single structure preferably consists of both a forcer coil and a test coil. The double coil carries a central capacitor plate or movable plate 84 spaced from and positioned between stationary capacitory plate 50 mounted on top cap 28 and a second stationary capacitory plate 86 mounted on, but insulated from, the magnet pole piece 74.

Figure 7:
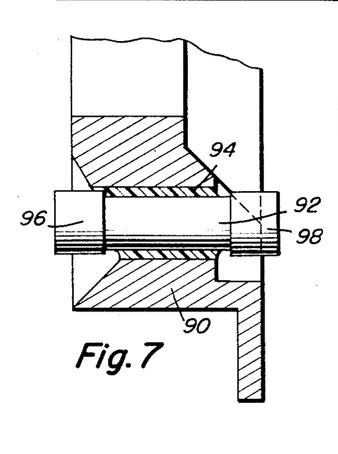
FIGURE 7 is an enlarged cross section through the suspension ring of FIGURE 2.

Clamped by its radial flange 88 between top cap 28 and the reduced end 76 of the magnetic cup is a soft iron (magnetic) suspension ring 90, a portion of which is shown to an enlarged scale in FIGURE 7. This suspension ring is apertured to carry three equally spaced posts 92 which are secured in the mounting ring apertures by epoxy adhesive 94. These posts are formed of rigid insulating material but are metallized at each end as illustrated at 96 and 98 in FIGURE 7 to established electrical connections in a manner more fully described hereafter.

Figures 4, 5, 6:
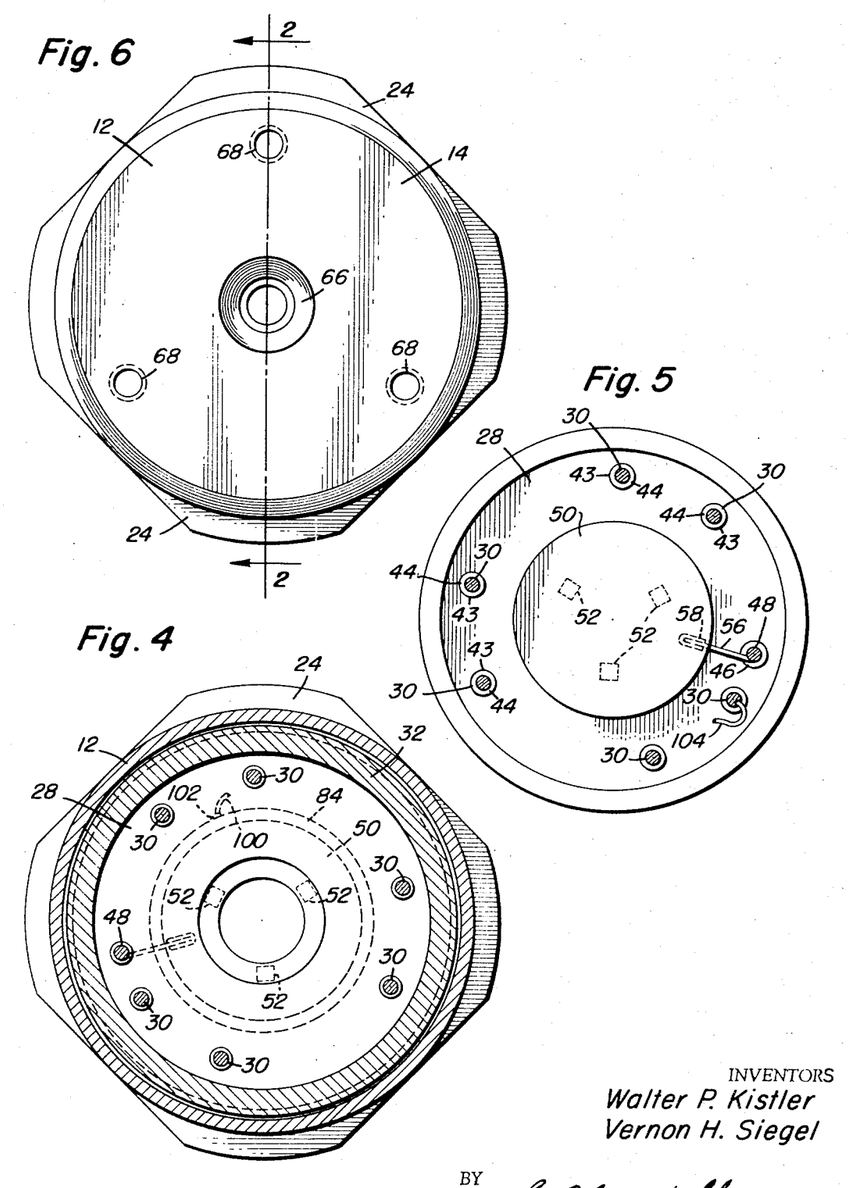
FIGURE 4 is a cross section taken along line 4—4 of FIGURE 1 showing the top cap in plan.
FIGURE 5 is a cross section showing the other side of the top cap taken along line 5—5 of FIGURE 2.
FIGURE 6 is an end view of the accelerometer package of FIGURE 1.

FIGURE 4 is a cross section taken along line 4—4 of FIGURE 1 through the spacer ring 32 showing the pins 30 (including short pin 48) projecting from the top cap 28. Stationary capacitor plate 50 and its supporting insulating blocks are indicated in dashed lines in FIGURE 4. Also illustrated in dashed lines in FIGURE 4 is the central or movable capacitor plate 84 and as illustrated, electrical connection to the movable capacitory plate is by way of a short lead 100 soldered to the outer edge of the center plate as at 102 in that figure. FIGURE 5 is a cross section taken along line 5—5 of FIGURE 2 and shows the underside or inside of the top cap 28 with the stationary capacitor plate 50 attached to it. An electrical lead 104 couples one of the pins 30 to the other stationary capacitor plate 86 of FIGURE 2 mounted on the permanent magnet pole piece. FIGURE 6 is an end view of the accelerometer 10 and shows three threaded apertures 68 in end plate 14 that contain screws used to adjust the axis of motion of the suspension assembly 80 to be coincident with the axis of the case 26 and perpendicular with the mounting flanges 24.

Figure 8:
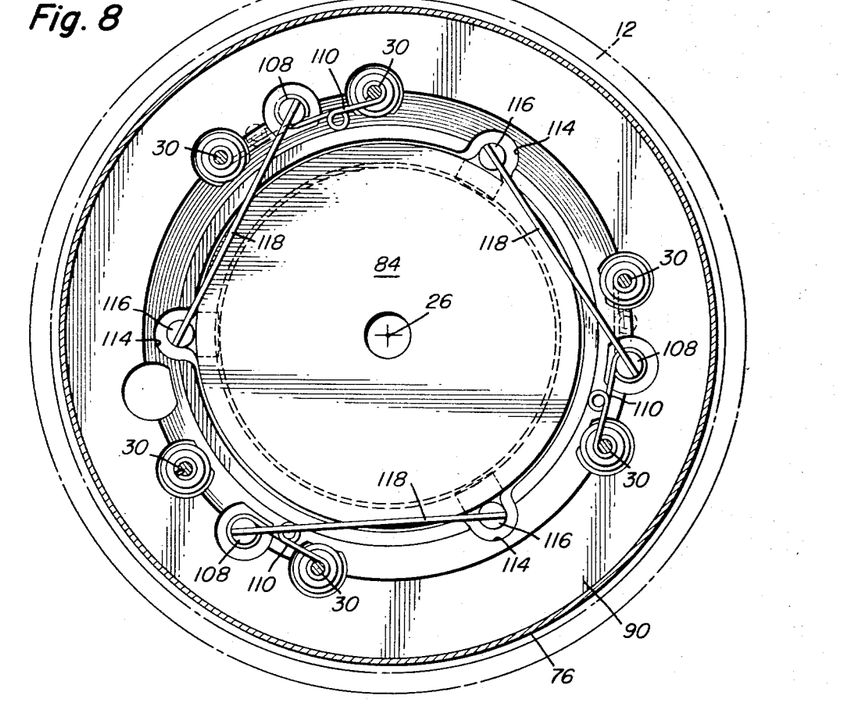
FIGURE 8 is a cross section taken along line 8—8 of FIGURE 2 illustrating the suspension system and movable capacitor plate.
Figure 9:
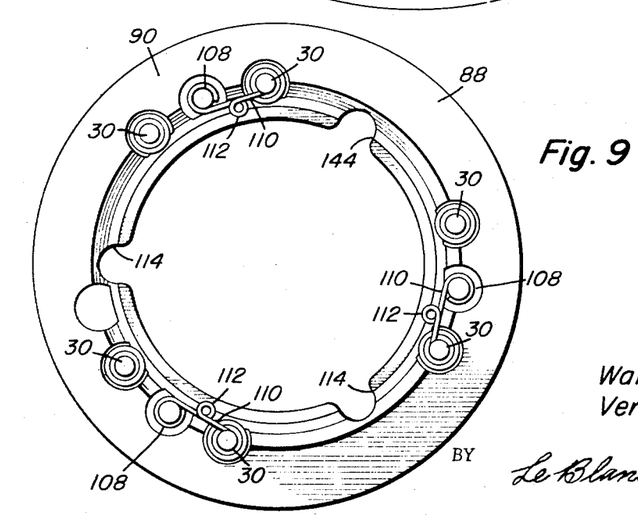
FIGURE 9 is a view showing the other side of the suspension ring from the side illustrated in FIGURE 8.

FIGURE 8 is a cross section taken along line 8—8 of FIGURE 2 in a direction opposite to that of FIGURE 5 and illustrates the suspension ring 90 and associated supporting posts for the suspension system. FIGURE 9 is a view similar to FIGURE 8 showing only the suspension ring 90. As illustrated, the suspension ring 90 in addition to the pins 30 supports three rigid posts 108 hereafter referred to as the stationary posts of the suspension system. These posts are electrically connected at one end to respective ones of the pins 30 by short wires 110 looped as at 112 to prevent forces from being transmitted to posts 108 from electrical connections to pins 30. As illustrated in FIGURE 9, suspension ring 90 is also provided with three equally spaced semicylindrical notches 114 to provide clearance for the suspension assembly posts.

Referring to FIGURE 8, the notches 114 in suspension ring 90 provided clearance for longitudinal movement of corresponding seismic mass posts 116 hereafter referred to as the movable posts since they are secured to the suspension assembly 80 and move with it. That is they are secured to the seismic mass including the impregnated double coil and movable capacitor plate 84. Connected to the end of each movable post 116 adjacent top cap 28 is one end of an elongated suspension wire 118 the other end of each of these suspension wires being connected to the corresponding end of a stationary post 108 secured to the suspension ring 90. Suspension members 118 are elongated, flexible fine wires of electrically conductive material and are soldered or otherwise suitably secured to the metallized ends of both the stationary and movable posts. The wires may be of circular cross section but preferably have a rectangular cross section whose length is approximately twice its width. The larger cross sectional dimension of each of the wires 118 is radial to the sensitive axis 26 of the accelerometer. Each of these wires is tangential to a circle having the sensitive axis 26 as its center. The wires are all equal in length and are connected at 120 degrees spaced intervals both to the movable posts 116 and the stationary posts 108.

Figure 10:
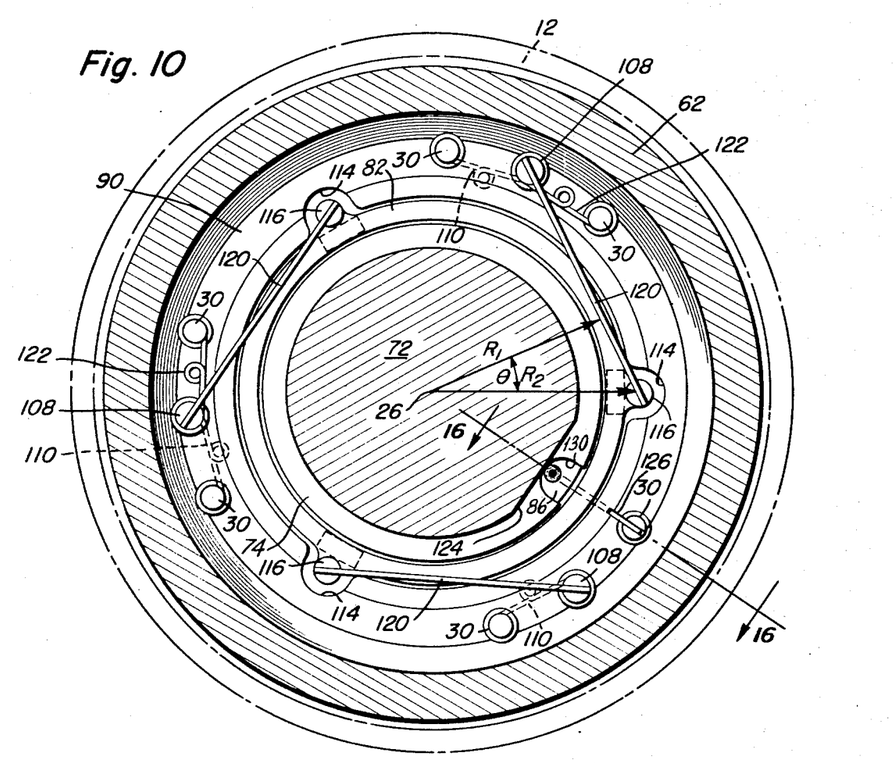
FIGURE 10 is a cross section taken along line 10—10 of FIGURE 2 showing the inner side of the suspension assembly.

FIGURE 10 is a cross section through the permanent magnet 72 of FIGURE 2 showing the other side of the suspension ring 90. Pins 30 all pass completely through the suspension ring and their inner ends can be seen in FIGURE 10. Likewise both the movable posts 116 and the stationary posts 108 pass through the suspension ring the former through notches 114 as illustrated in FIGURE 10. Connected to the inner ends of these posts are three additional suspension wires 120 in all respects similar to the suspension wires 118 of FIGURE 8 connected to the opposite end of the suspension assembly or system 80. It should be noted that corresponding wires 120 and 118 form wire pairs with both wires lying in the same plane parallel to the sensitive axis 26. That is the upper rightmost wire 120 in FIGURE 10 lies in the same plane as the upper leftmost wire 118 of FIGURE 8. These two wires with their corresponding posts 108 and 116 form a parallelogram in the plane of the wires parallel to the sensitive axis 26 of the accelerometer. The remaining suspension wires form additional parallelograms with their cooperating posts likewise parallel to the sensitive axis. As before the wires are electrically conductive and electrical connection to the pins 30 is completed by the flexible leads 122 similar to the looped leads 110 of FIGURE 8.

As is further illustrated in FIGURE 10, one side of the end of permanent magnet 72 is cut away as at 124 to provide an electrical connection by way of a lead 126 to one of the pins 30. This lead is attached by epoxy to the permanent magnet as at 128 in FIGURE 11 and extends upwardly through a slot 130 provided in the side of the permanent magnet pole piece 74 where it is suitably connected as by soldering 132 to the stationary capacitor plate 86. This plate is mounted on the pole piece by a plurality of insulating blocks 138, preferably three in number and equally spaced about the sensitive axis of the accelerometer adjacent the outer edge of the capacitor plate and the pole piece 74 on which it is mounted.

Figure 12:
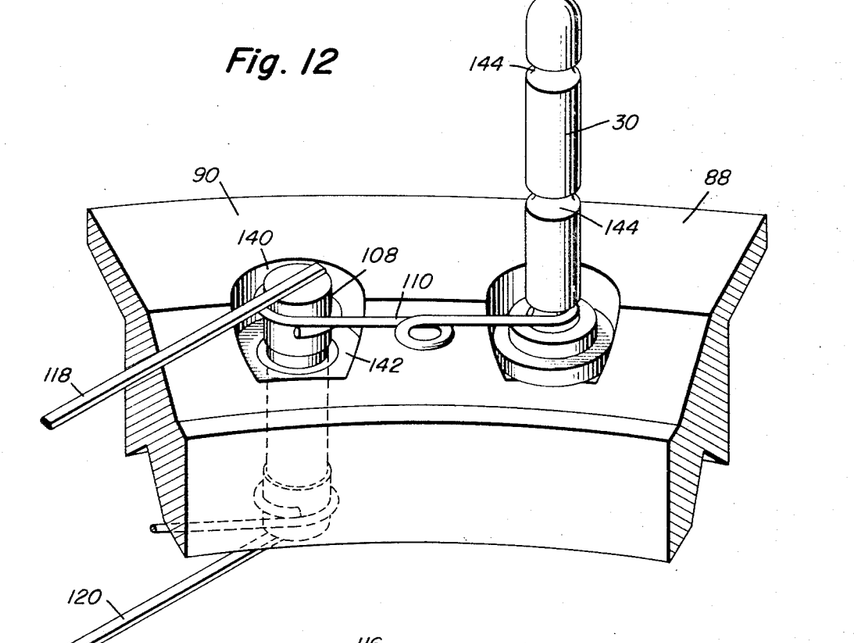
FIGURE 12 is an enlarged perspective view of a portion of the suspension system of the present invention.

FIGURE 12 is a perspective view illustrating to an enlarged scale the connection of the suspension wires 118 and 120 to one of the stationary posts 108. This post is embedded in a suitable aperture 140 in suspension ring 90 by means of epoxy resin as indicated at 142. Electrical connection is from the metallized end of insulating post 108 by way of flexible lead 110 to one of the pins 30. The end of lead 110 is curved about and preferably soldered in one of the annular grooves 144 formed in the pins 30 for this purpose.

Figure 13:
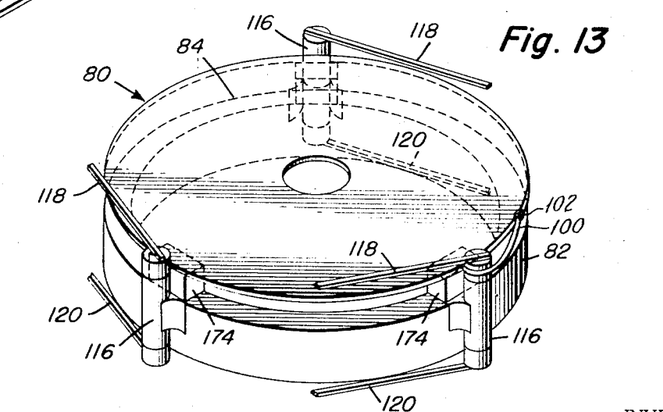
FIGURE 13 is a perspective view showing the seismic mass including impregnated coil, movable capacitor plate, portions of the support wires, and the movable posts.
Figure 14:
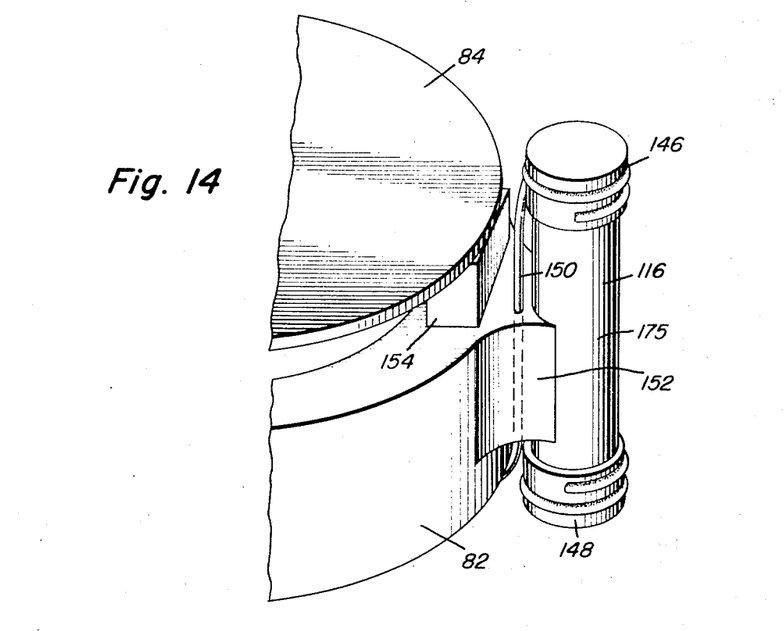
FIGURE 14 is an enlarged view showing the manner of the connection of one of the movable posts to the inertial mass upon which it is mounted.
Figure 15:
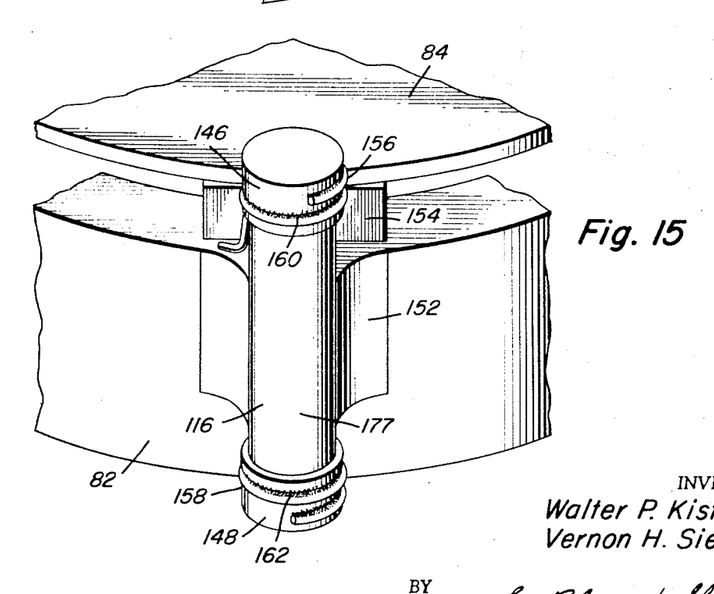
FIGURE 15 is a perspective view of the same post taken at right angles to FIGURE 14.

FIGURE 13 shows the overall movable assembly 80 including the movable capacitor plate 84 and resin impregnated double coil 82 to which the movable posts 116 are attached. The attachment of these posts is indicated to an enlarged scale in FIGURES 14 and 15. As seen in those figures, the posts are all metallized at each end, that is the posts are made of rigid insulating material, but are provided with a metallic coating at each end as indicated at 146 and 148 in FIGURE 14, which conductive metallic coating covers not only the annular end portions illustrated, but also covers each circular end of the post. As illustrated in FIGURE 14, one of the connections to the coil 82 is by way of lead 150 and this lead passes through the block of epoxy adhesive 152 which secures the post 116 to the coil 82. Movable capacitor plate 84 is mounted to coil 82 by a plurality of insulating bocks 154. FIGURE 15 shows a typical construction for one of the other movable posts 116 again secured to the coil 82 by a block of epoxy 152. Connection from the coil to the opposite metallized ends 146 and 148 is in this case direct by way of leads 102 and 158 which are coiled around the ends of the post and preferably soldered to it as indicated at 160 and 162. The suspension wires 118 and 120 are preferably soldered to the extreme ends of both the stationary and movable posts as is clearly illustrated in FIGURES 12 and 13.

Figure 11:
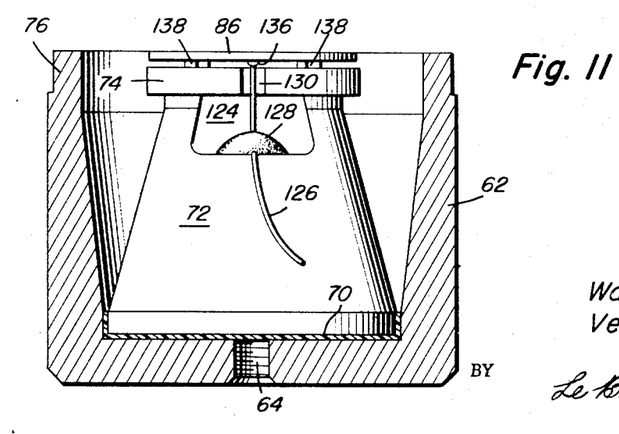
FIGURE 11 is a cross section through the soft iron cup showing the enclosed permanent magnet and electrical connection to one of the stationary plates of the capacitive pickoff.
Figure 16:
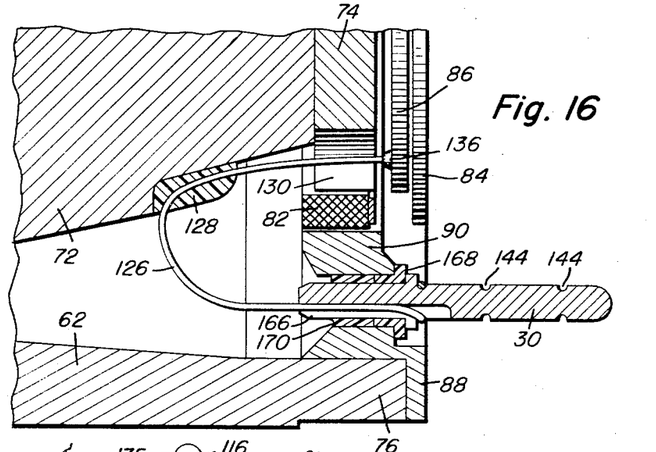
FIGURE 16 is an enlarged cross section illustrating the mounting for one of the connector pins of the accelerometer of this invention.

FIGURE 16 is a cross section showing further details of the structure for establishing electrical connection to stationary capacitor plate 86 mounted on the pole piece 74 of the permanent magnet 72 which structure is also seen in FIGURE 11. Pin 30 is provided with the previously described annular grooves 144 and the end of lead 126 is received in one of these grooves. The pin is also provided with a longitudinal slot 166 through which the lead passes. The pin is mounted in suspension ring 90 by a nylon sleeve or bushing 168 to accurately position the pin. If grooves such as 144 are also provided on the inner ends of the pins, then the slot 166 may be omitted.

Figure 17:
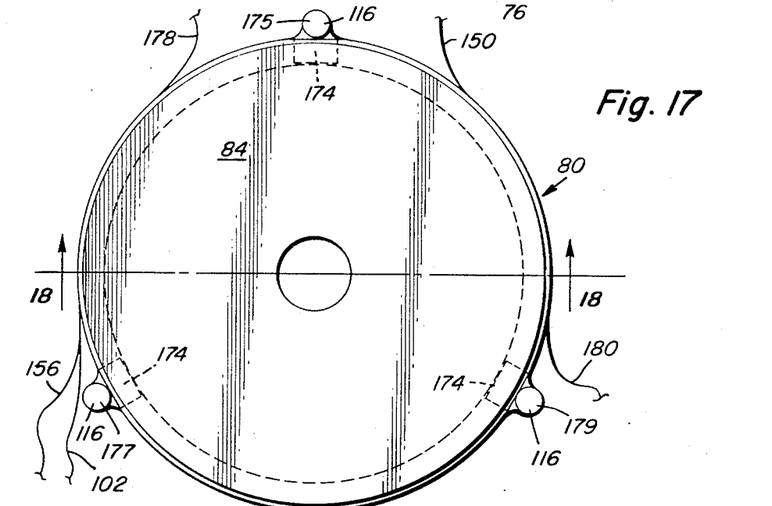
FIGURE 17 is a plan view of the inertial or moving assembly illustrating the movable capacitor plate and posts.
Figure 18:
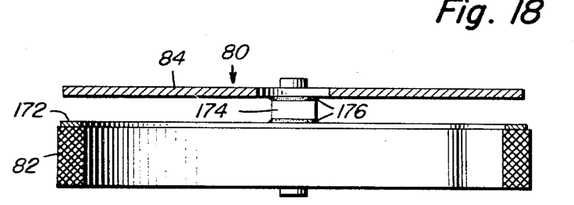
FIGURE 18 is a cross section through the assembly of FIGURE 17 illustrating the manner of connecting the movable capacitor plate to the movable coil.

FIGURES 17 and 18 illustrate further details of the movable assembly 80 formed by the movable coil and movable capacitor plate carried by it. Coil 80 is impregnated with a suitable plastic resin material (epoxy) so as to impart to the annular coil a substantially rigid rectangular cross section as illustrated in FIGURE 18. Attached to the coil is an annular damping ring 172 and attached to this ring are three equally spaced insulating blocks 174. These insulating blocks are also illustrated in FIGURE 13 and they are soldered as at 176 both to the damping ring 172 and to the movable capacitor plate 84 such that the capacitor plate 84 is thus attached to and carried by the movable coil 82.

As previously mentioned, while the coil 82 is for the sake of simplicity illustrated as a single coil, in the preferred embodiment, it consists of both a forcer coil and a compensating or test coil as it is more often called. In order to establish connection to both the forcer portion of the coil and the test portion of the coil 82, the coil is provided with a plurality of electrical leads such as the four leads 150, 156, 178 and 180 illustrated in FIGURE 17. Lead 102 is the lead from the movable capacitor plate 84. In a typical construction, the opposite ends of the test portion of the coil formed by leads 150 and 178 both project from the side of the coil adjacent the permanent magnet. Lead 178 is soldered to the permanent magnet end 148 of movable post 175 in FIGURE 17 (one of the posts 116) whereas the opposite end of the test portion of the coil formed by lead 150 passes through the epoxy fillet 152 in FIGURE 14 and is soldered to the top cap end 146 of post 175. This establishes electrical connections to the opposite ends of the test portion of coil 82.

The forcer portion of coil 82 is wound such that its opposite ends formed by leads 156 and 180 in FIGURE 17 project from opposite ends of the coil assembly. Lead 156 is coupled to the permanent magnet end 148 of post 177 (another one of the movable posts 116). End 146 of this post is shown in FIGURE 15 as connected to the movable capacitor plate lead 102 passing through the epoxy fillet to plate 84. The top cap end of the forcer portion of coil 82 formed by lead 180 is soldered to the corresponding end 146 of the remaining movable post 179 in FIGURE 17. The opposite end of this last movable post is not utilized for an electrical connection, but only as a portion of the mechanical suspension system.

Figure 19:
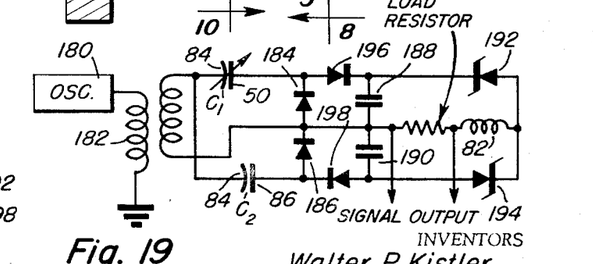
FIGURE 19 is a circuit diagram for the accelerometer of this invention.

FIGURE 19 is a circuit diagram of one type of circuit useable with the accelerometer of this invention. The circuit comprises an oscillator 180 feeding a transformer 182 whose secondary is connected to the movable plate 84 forming a part of the differential capacitor labeled $C_1$ and $C_2$ in FIGURE 19. The other sides of capacitor $C_1$ and $C_2$ are formed by the two stationary plates 50 and 86. The capacitors are charged from the secondary winding of transformer 182 through diodes 184 and 186. Capacitors 188 and 190 are provided to store charges delivered by capacitors $C_1$ and $C_2$ so that a continuous current is delivered through Zener diodes 192 and 194 to the forcer portion of coil 82. Circuit isolation is provided by the rectifier diodes 196 and 198 which act as current directors in the circuit. Since only a single phase source is used to energize capacitors $C_1$ and $C_2$ in FIGURE 19, these capacitors charge through their respective diodes 184 and 186 on alternate half cycles of the applied voltage. Capacitors 188 and 190 are added to the circuit to store charges delivered by capacitors $C_1$ and $C_2$ so that a continuous current is delivered through Zener diodes 192 and 194. This arrangement permits a simplified mechanical assembly wherein one plate of the capacitors $C_1$ and $C_2$ is electrically connected and in fact constitutes a single movable capacitor plate 84 forming a portion of the seismic mass and mounted to the coil 82.

It is apparent from the above, that the present invention provides a novel and improved accelerometer construction having increased sensitivity and reliability over prior constructions. Important features of the present invention include the suspension of the seismic mass including a forcer coil by means of a plurality of tangential wires, which wires cooperate with rigid posts to form three parallelogram suspension sub-assemblies. Each of the parallelograms preferably lies in a plane parallel to the sensitive axis of the accelerometer and is attached to the movable assembly approximately at the point of tangency thereto. That is, referring to FIGURE 10, $R_1$ represents a radial line from the sensitive axis 26 of the accelerometer to one of the suspension wires 120 which radial line is perpendicular to the suspension wire. $R_2$ is a similar radial line drawn from the sensitive axis to the point of attachment of the suspension wire to the movable assembly, i.e., the center of movable post 116. In the present invention $R_1$ and $R_2$ are of approximately the same length but differ slightly to allow for the fact that during operation when the suspension assembly experiences motion resulting from acceleration, the flexible leads 120 illustrated in FIGURE 10 are deflected from their mechanical rest position into (or out of) the plane of the paper of that figure and $R_2$ approaches the radial plane of $R_1$. In the preferred embodiment, the angle $\theta$ between $R_1$ and $R_2$ is preferably chosen to be approximately 15 degrees.

The flexibility of the wires 118 and 120 in all directions transverse thereto completely eliminates the likelihood of breakage, particularly when the accelerometer is subject to high G transverse loads. The double post construction for each of the parallelograms adds substantial rigidity and accuracy to the mechanical construction and is particularly important in rendering the suspension system much less susceptible to variations as a result of changing temperatures to which the unit might be subjected in aerospace applications. While the preferred embodiment is illustrated and described as involving six suspension wires, with three at each end of the seismic mass, and all extending outwardly in a counterclockwise direction from the seismic mass as viewed in FIGURE 10, various modifications and changes can be made without undue loss of desirable characteristics. However, in all cases the suspension system should comprise three pairs of parallel and equal length flexible wires used in conjunction with a pair of rigid posts extending parallel to the sensitive axis of the accelerometer, one post connected to the moving mechanical assembly and the other post stationarily mounted in the accelerometer. Both the posts and wires of a single parallelogram should all lie in the same plane.

The conditions for the suspension system may be summarized as follows. It consists of three parallelograms with the two posts of a pair being exactly parallel and exactly the same length. The same is true for the two wires of the same parallelogram. However the following variations are possible.

(a) The wires need not be coplanar. The parallelograms can be axially displaced with respect to each other.

(b) If the parallelograms are of different length the suspension will still operate but the seismic mass will no longer translate in a perfectly straight line.

(c) The three parallelograms need not be 120 degrees apart as long as the inner and outer radii are the same. In other words the radial distance from the sensitive axis must be the same for all the stationary posts and must be the same for all movable posts but the two radial distances need not be equal.

(d) All posts must be parallel to each other.

(e) The parallelograms can be of different height (axial direction) without significantly impairing performance.

(f) If the parallelograms have different lengths (radial direction) the suspension will still work but translation will not be truly linear.

(g) If the wires are located at different radial angles or locations the suspension will still work but again translation will not be truly linear.

As a further summary, first, all six rods must be parallel. Second, all three parallelograms should be the same length and should have the same inner and outer radius. Third, finally, as practically preferred but not absolutely necessary requirements, the parallelograms should have the same height, the same axial location and should be 120 degrees apart.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A suspension system for an inertial force sensing instrument having a sensitive axis comprising a seismic mass mounted on said axis, at least three first elongated rigid posts parallel to and equidistant from said axis and secured in fixed relation to said mass, a second equal number of stationary elongated rigid posts parallel to and equidistant from said axis, and a pair of spaced, parallel wires connecting corresponding first and second posts whereby said posts and wires form a plurality of parallelograms lying in planes parallel to said axis and supporting said seismic mass for translational and rotary motion along said sensitive axis.

2. A system according to claim 1 wherein seismic mass includes an annular electrical coil.

3. A system according to claim 2 wherein said coil is impregnated with resin for rigidity.

4. A suspension system for an inertial force sensing instrument having a sensitive axis comprising a seismic mass including an annular electrical coil mounted on said axis, at least three first elongated movable rigid posts parallel to and equidistant from said axis and secured in fixed relation to said annular electrical coil, three equally spaced stationary rigid posts parallel to and equidistant from said axis and secured to said instrument parallel to said movable posts, and a pair of wires secured to the opposite ends of corresponding movable and stationary posts whereby said posts and wires form three parallelograms lying in planes parallel to said axis, each of said wires extending from a movable to a stationary post tangential to a circle having said sensitive axis as its center.

5. A suspension system according to claim 4 wherein at least some of said wires are electrically conductive.

6. A suspension system according to claim 4 wherein said wires have substantially rectangular cross sections with a major dimension radial to said axis.

7. A suspension system for an inertial force sensing instrument having a sensitive axis comprising a resin impregnated movable annular electrical coil movable along said axis, three equally spaced rigid insulating posts parallel to and equidistant from said axis and secured to said coil in fixed relation for movement with said coil, three rigid stationary insulating posts parallel to said movable posts and equidistant from said axis, each of said posts having conductive portions at each end, a pair of flexible conductive wires secured to the opposite ends of corresponding movable and stationary posts whereby said posts and wires form three parallelograms supporting said coil for translational and rotary motion along a sensitive axis, each of said wires extending from a movable to a stationary post tangential to a circle having said sensitive axis as its center, said wires all extending outwardly in a clockwire direction when viewed from one end of said coil, the radial distance from said axis to said circle being substantially equal to the distance from said axis to the connection of one of said wires to a corresponding movable post.

8. A suspension system according to claim 7 wherein the angle formed by a first radial line from said axis to the point of tangency of said one wire to said circle and a second radial line from said axis to said connection is approximately 15°.

9. In an accelerometer of the servo-type wherein an inertial element comprising a coil moves along a sensitive axis in a magnetic field and is caused to be restored to a preselected position in said field by a signal generated as a result of said movement, the improvement which comprises an inertial element including an annular forcer coil movable along said axis in said field, a variable electrical impedance for sensing the movement of said inertial element, and suspension means including at least five wires secured to said inertial element and extending away from said inertial element in a substantially tangential direction relative to said coil, said wires each being secured at one end to a rigid post movable with said coil and at its other end to a stationary rigid post, said posts all being parallel to said axis, all stationary posts being equidistant from said axis, and all movable posts also being equidistant from said axis, said wires all lying in planes transverse to the axis of movement of said coil, at least three of said wires being connected to said movable posts at different angular locations relative to said axis, all of said wires extending away from said inertial element in a clockwise direction looking in one direction along said axis, at least four of said wires being of substantially equal length between their points of attachment to said stationary and movable posts.

10. Apparatus according to claim 9 wherein said variable electrical impedance includes a movable capacitor plate mounted on said coil.

11. Apparatus according to claim 9 wherein said variable electrical impedance comprises a first movable electrical conductor carried by said inertial element and a second stationary electrical conductor adjacent to but spaced from said first electrical conductor, said impedance varying in accordance with the spacing between said two conductors.

12. In an accelerometer of the servo-type wherein an inertial element comprising a coil moves along a sensitive axis in a magnetic field and is caused to be restored to a preselected position in said field by a signal generated as a result of said movement, the improvement which comprises an inertial element including an annular forcer coil movable along said axis in said field, a magnetic assembly including a substantially circular magnetic pole piece projecting into said annular coil, a variable electrical impedance for sensing the movement of said inertial element, said variable impedance comprising a first movable electrical conductor carried by said inertial element and a second stationary electrical conductor adjacent to but spaced from said first electrical conductor, said impedance varying in accordance with the spacing between said two conductors, means for coupling said variable impedance to a source of electrical energy, means for deriving an electrical output from said variable impedance indicative of the movement of said inertial element, and suspension means including a first plurality of elongated rigid posts secured in fixed relation to said inertial element, a second equal number of stationary elongated rigid posts, said posts all being parallel to said axis, all stationary posts being equidistant from said axis, and all movable posts also being equidistant from said axis, and a pair of spaced, parallel wires connecting corresponding first and second posts whereby said posts and wires form a plurality of parallelograms supporting said inertial element for translational and rotary motion along said axis.

13. Apparatus according to claim 12 wherein said first posts are secured to said forcer coil by epoxy resin.

14. Appartus according to claim 12 wherein said wires are electrically conductive.

15. Apparatus according to claim 12 wherein said variable electrical impedance comprises a differential capacitor including a movable capacitor plate carried by said inertial element, and a pair of stationary capacitor plates mounted on opposite sides of said movable plate.

16. In an accelerometer of the servo-type wherein an inertial element comprising a coil moves along a sensitive axis in a magnetic field and is caused to be restored to a preselected position in said field by a signal generated as a result of said movement, the improvement which comprises an inertial element including an annular forcer coil movable along said axis in said field, a magnetic assembly including a substantially circular magnetic pole piece projecting into said annular coil, a variable electrical impedance for sensing the movement of said inertial element, said variable impedance comprising a first movable electrical conductor carried by said inertial element and a second stationary electrical conductor adjacent to but spaced from said first electrical conductor, said impedance varying in accordance with the spacing between said two conductors, means for coupling said variable impedance to a source of electrical energy, means for deriving an electrical output from said variable impedance indicative of the movement of said inertial element, three equally spaced rigid posts secured to said coil in fixed relation for movement with said coil, three rigid stationary posts, said posts all being parallel to said axis, all stationary posts being equidistant from said axis, and all movable posts also being equidistant from said axis, and a pair of wires secured to the opposite ends of corresponding movable and stationary posts whereby said posts and wires form three parallelograms supporting said coil for translational and rotary motion along a sensitive axis, each of said wires extending from a movable to a stationary post tangential to a circle having said axis as its center.

17. Apparatus according to claim 16 including a permanent magnet coupled to said pole piece, a magnetic cup receiving said magnet, and a magnetic ring between said cup and pole piece, said ring being secured to said cup to establish a radial magnetic flux between said pole piece and said ring, said annular coil being suspended by said wires between said pole piece and said ring.

18. Apparatus according to claim 17 wherein said stationary posts are mounted in said ring.

19. Apparatus according to claim 18 wherein said stationary posts pass through said ring and are secured therein by adhesive.

20. In an accelerometer of the servo-type wherein an inertial element comprising a coil moves along a sensitive axis in a magnetic field and is caused to be restored to a preselected position in said field by a signal generated as a result of said movement, the improvement which comprises an inertial element including an annular forcer coil movable along said axis in said field, a magnetic assembly including a substantially circular magnetic pole piece projecting into said annular coil, a variable electrical impedance for sensing the movement of said inertial element, said variable impedance comprising a first movable electrical conductor carried by said inertial element and a second stationary electrical conductor adjacent to but spaced from said first electrical conductor, said impedance varying in accordance with the spacing between said two conductors, means for coupling said variable impedance to a source of electrical energy, means for deriving an electrical output from said variable impedance indicative of the movement of said inertial element, three equally spaced rigid insulating posts secured to said coil in fixed relation for movement with said coil, three rigid stationary insulating posts, said posts all being parallel to said axis, all stationary posts being equi-distant from said axis, and all movable posts also being equi-distant from said axis, each of said posts having conductive portions at each end, a pair of flexible conductive wires secured to the opposite ends of corresponding movable and stationary posts whereby said posts and wires form three parallelograms supporting said coil for translational and rotary motion along said axis, each of said wires extending from a movable to a stationary post tangential to a circle having said axis as its center, said wires all extending outwardly in a clockwise direction when viewed from one end of said coil.

21. Apparatus according to claim 20 wherein said inertial element includes both a forcer coil portion and a test coil portion, said coil portions being impregnated with a resin to impart rigidity to said coil.

22. Apparatus according to claim 20 including a plurality of electrical connector pins, and electrically conductive means coupling the opposite ends of at least some of said stationary posts to said pins.

References Cited

UNITED STATES PATENTS

| | | | |
|---|---|---|---|
| 2,564,705 | 8/1951 | Maynard | 73—515 |
| 2,869,851 | 1/1959 | Sedgfield et al. | 73—517 |
| 2,923,904 | 2/1960 | Hieber. | |

JAMES J. GILL, *Primary Examiner.*